United States Patent Office 3,440,067
Patented Apr. 22, 1969

3,440,067
CERAMIC DIELECTRICS
Shinobu Fujiwara, Minami-Akita-gun, Akita-ken, and Takao Shiraiwa, Akita-shi, Japan, assignors to TDK Electronics Co., Ltd., Tokyo, Japan
Filed June 8, 1964, Ser. No. 373,314
Int. Cl. C04b 35/00
U.S. Cl. 106—39                                    4 Claims

ABSTRACT OF THE DISCLOSURE

Ceramic dielectric materials are provided having a relatively large dielectric constant and high Q-value, namely, low dielectric loss. The dielectric materials consist essentially of a sintered mixture of $BaTiO_3$ ranging from 30 to 93 molar percent, $La_2O_3 \cdot 2TiO_2$ ranging from 1 to 30 molar percent and $SrTiO_3$ ranging from 1 to 69 molar percent.

---

The present invention relates to an improvement in ceramic dielectrics.

The object of this invention is to provide ceramic dielectrics which have relatively large dielectric constant and high Q-value, namely, low dielectric loss.

Recently, the frequently range used for communication equipments is being developed toward the higher frequency region. With the increase of the frequency, the electrostatic capacities of condensers may be small and therefore the dielectric constants need not be extremely large. On the other hand, the Q-values of condensers require high values because a large loss coefficient of condensers severely impairs the utility at high frequency. The dielectrics in accordance with this invention have the extremely suitable properties for the above-mentioned purpose.

The ceramic dielectrics, which have been widely used, may be roughly classified into two types; the one mainly comprises titanium oxide and the other mainly comprises barium titanate.

Titanium oxide type dielectrics which have been widely used as temperature compensators, have high Q-values ranging from 2000 to 3000 at high frequency, whereas their dielectric constants are small. For example, the dielectric constant of rutile type ceramics which are regarded as relatively highly practical type, is only of the order of 114 or so.

On the other hand, barium titanate type dielectrics have large dielectric constants of more than 2000, and low Q-values of about 150, with extremely large temperature dependence of dielectric constant, and the minimum value of the temperature coefficient of dielectric constant is approximately $-6000 \times 10^{-6}/^\circ C$.

The characteristic feature of the present invention is to provide a type of ceramic dielectrics which lies between those of the two types mentioned above. It has larger dielectric constants than those of the titanium oxide type which have small dielectric constants, and much higher Q-values than those of barium titanate type which have large dielectric constants.

In detail, this invention relates to a type of ceramic dielectrics whose main components are barium titanate ($BaTiO_3$), lanthanum (III) titanium (IV) oxide $$(La_2O_3 \cdot 2TiO_2)$$

and strontium titanate ($SrTiO_3$), and it has dielectric constants ranging from 100 to 1400 or so, Q-values ranging from 600 to 15,000 and temperature coefficients of dielectric constants ranging from $-100 \times 10^{-6}/^\circ C$. to $-7000 \times 10^{-6}/^\circ C$. or so.

In the present invention, the range of the proportions of the three components, where the favorable properties of medium dielectric constant, low dielectric loss and small temperature coefficient of dielectric constants can be obtained, is limited, as follows:

|  | Molar percentage |
|---|---|
| $BaTiO_3$ | 30–93 |
| $La_2O_3 \cdot 2TiO_2$ | 1–30 |
| $SrTiO_3$ | 1–69 |

The reasons for limiting the proportions to the said values are: (1) When the proportion of barium titanate ($BaTiO_3$) is below 30 molar percent, dielectric constant ($\epsilon$) becomes small and when it exceeds 93 molar percent, Q-value becomes extremely low. (2) When the proportion of lanthanum titanium oxide ($La_2O_3 \cdot 2TiO_2$) is below 1 molar percent, the effect of addition thereof is ineffective, and when it exceeds 30 molar percent, vitrification is difficult. (3) When the proportion of strontium titanate ($SrTiO_3$) is below 1 molar percent, the desired characteristics can not be obtained, and when it exceeds 70 molar percent, dielectric constant ($\epsilon$) becomes small.

For a better understanding of the present invention, reference is had to the accompanying drawings.

Figure 1:
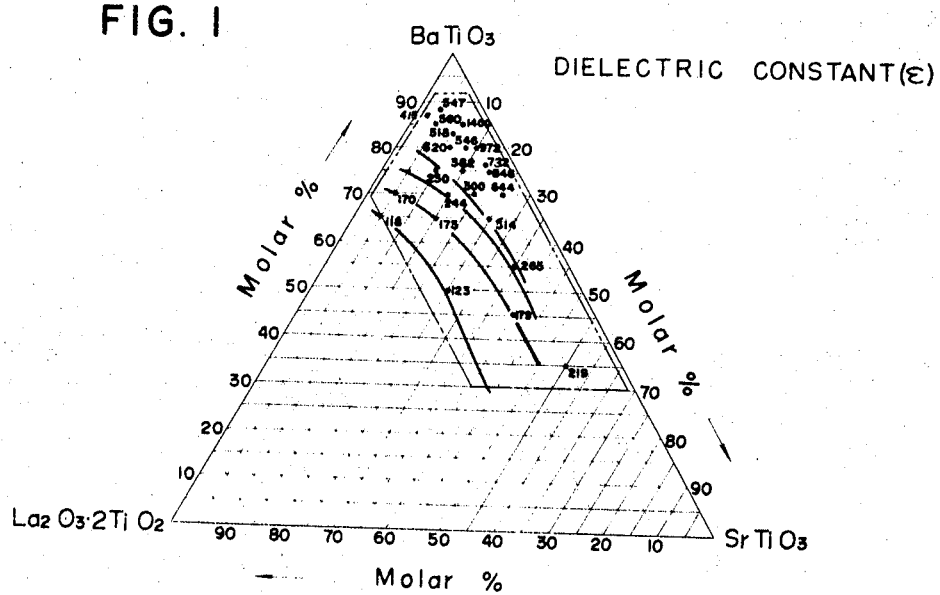
FIGURE 1 is a ternary diagram representing the range of the proportion of the three components of the ceramic bodies within the present invention, that is, barium titanate ($BaTiO_3$), lanthanum titanium oxide ($La_2O_3 \cdot 2TiO_2$) and strontium titanate ($SrTiO_3$). The numerical values and the curves in the diagram represent the dielectric constants.
Figure 2:
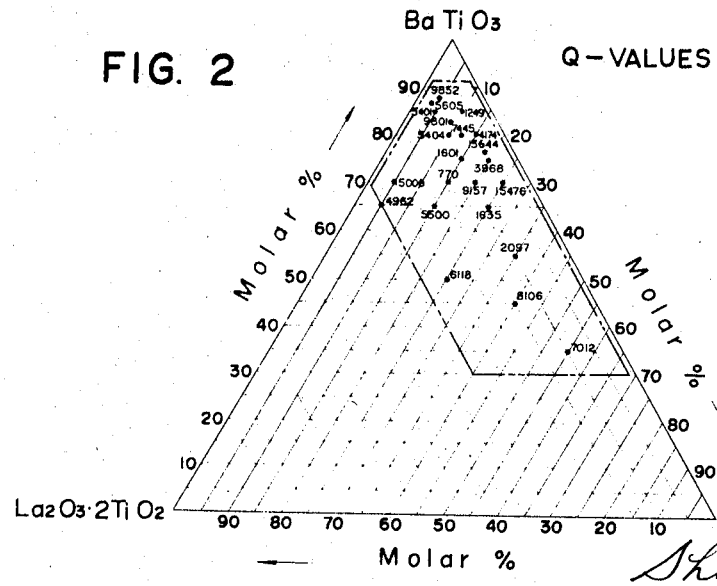
FIGURE 2 is a ternary diagram representing the range of the proportion of the three components of the ceramic bodies within the present invention, that is, barium titanate ($BaTiO_3$), lanthanum titanium oxide ($La_2O_3 \cdot 2TiO_2$) and strontium titanate ($SrTiO_3$). The numerical values in the diagram represent the Q-values.
Figure 3:
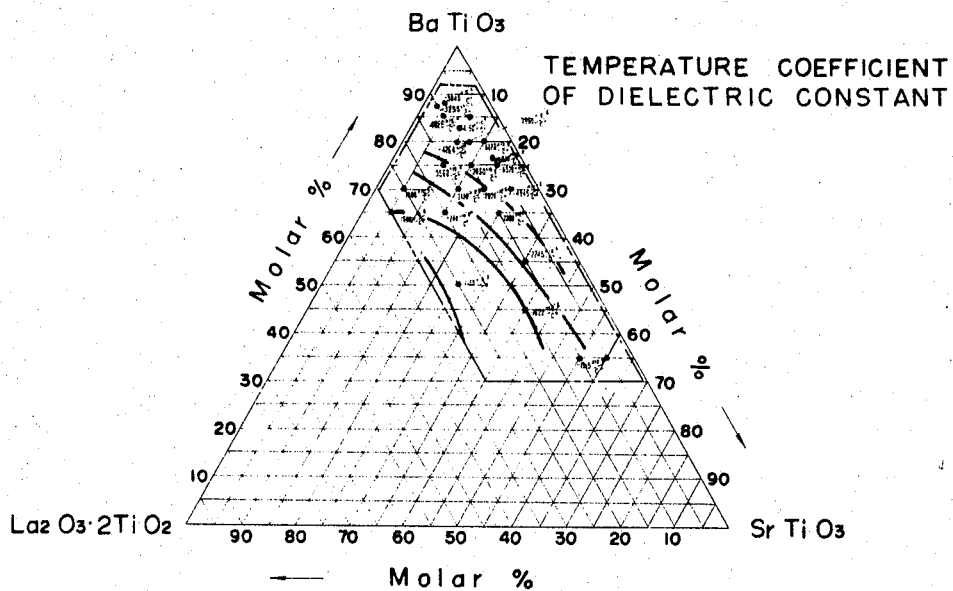

FIGURE 3 is a ternary diagram representing the range of the proportion of the three components of the ceramic bodies within the present invention, that is, barium titanate ($BaTiO_3$), lanthanum titanium oxide ($La_2O_3 \cdot 2TiO_2$) and strontium titanate ($SrTiO_3$). The numerical values and the curves in the diagram represent the temperature coefficients of dielectric constants. The measurements of the properties have been all carried out at a frequency of 1 megacycle per second.

The dielectrics of the present invention are produced by the following procedure:

Stir raw materials, that is, barium carbonate ($BaCO_3$), strontium carbonate ($SrCO_3$), lanthanum oxide ($La_2O_3$) and titanium oxide ($TiO_2$), for a period enough to render the mixture homogeneous, calcine the mixture in oxidizing atmosphere at the temperature range of 1100° C. to 1300° C. for about 2 hours, pulverize the calcined material into fine powder followed by adding a binder in solid or liquid form, in which the materials are not soluble, and form the powder into the desired shape such as disc under sufficient pressure for shaping, and then sinter finally the shaped materials in oxidizing atmosphere at the temperature range of 1300° C. to 1400° C. for about 3 hours.

The following examples will give a closer insight into the present invention.

EXAMPLE I

The raw materials employed were barium carbonate ($BaCO_3$), strontium carbonate ($SrCO_3$), lanthanum oxide ($La_2O_3$) and titanium oxide ($TiO_2$). In this case, barium titanate ($BaTiO_3$) can be formed by the reaction of a mixture of barium carbonate ($BaCO_3$) with titanium oxide ($TiO_2$) on firing, strontium titanate ($SrTiO_3$) can be formed by the reaction of a mixture of strontium carbonate ($SrCO_3$) with titanium oxide ($TiO_2$) on firing and lanthanum titanium oxide ($La_2O_3 \cdot 2TiO_2$) can be formed by the reaction of a mixture of lanthanum oxide ($La_2O_3$)

with titanium oxide ($TiO_2$) on firing. The titanium oxide ($TiO_2$), barium carbonate ($BaCO_3$), strontium carbonate ($SrCO_3$) and lanthanum oxide ($La_2O_3$) were added so that the following proportion was finally given:

$BaTiO_3:La_2O_3 \cdot 2TiO_2:SrTiO_3 = 77:5:18$ (molar percent)

Then the mixture was mixed and stirred for about twenty hours. The calcination of raw material in powder mixture was carried out in air at the temperature of 1260° C.

After calcination, the material was pulverized into a fine powder so that the coarsest particles would pass a 250 mesh screen and the finest particles would not pass a 300 mesh screen. To the material in powder form, a small quantity of wheat starch solution in water was added. The material was shaped and pressed into disc shape of 15.2 millimeters in diameter and 0.8 millimeter in thickness under the shaping pressure of four tons per square centimeter, and then sintered finally in air at a temperature of 1350° C. for three hours.

The characteristics of ceramic dielectric thus obtained show following values:

dielectric constant ($\epsilon$)—732,
Q-value—13644,
temperature coefficient of dielectric constant—

$$-5510 \times 10^{-6}/° C.$$

EXAMPLE II

The raw materials employed were barium carbonate ($BaCO_3$), strontium carbonate ($SrCO_3$), lanthanum oxide ($La_2O_3$) and titanium oxide ($TiO_2$). In this case, too, barium titanate ($BaTiO_3$), strontium titanate ($SrTiO_3$) and lanthanum titanium oxide ($La_2O_3 \cdot 2TiO_2$) can be formed on firing as in Example I. The titanium oxide ($TiO_2$), barium carbonate ($BaCO_3$), strontium carbonate ($SrCo_3$) and lanthanum oxide ($La_2O_3$) were added so that the following proportion was finally given:

$BaTiO_3:La_2O_3 \cdot 2TiO_2:SrTiO_3 = 87:10:3$ (molar percent)

Then the mixture was mixed and stirred for about twenty hours. The calcination of raw material in powder mixture was carried out in air at a temperature of 1280° C.

After calcination, the material was pulverized into a fine powder so that the coarsest particles would pass a 250 mesh screen and the finest particles would not pass a 300 mesh screen. To the material in powder form, a small quantity of wheat starch solution in water was added. The material was shaped and pressed into disc shape of 15.2 millimeters in diameter and 0.8 millimeter in thickness under the shaping pressure of four tons per square centimeter, and then sintered finally in air at a temperature of 1370° C. for three hours.

The ceramic dielectric thus obtained shows following characteristics:

dielectric constant ($\epsilon$)—415,
Q-value—5605,
temperature coefficient of dielectric constant—

$$-3235 \times 10^{-6}/° C.$$

What is claimed is:
1. A ceramic dielectric consisting essentially of a sintered mixture of $BaTiO_3$ ranging from 30 to 93 molar percent, $La_2O_3 \cdot 2TiO_2$ ranging from 1 to 30 molar percent and $SrTiO_3$ ranging from 1 to 69 molar percent.
2. A ceramic dielectric according to claim 1 in which the proportion of $BaTiO_3$ is from about 77 to about 87 molar percent, the proportion of $La_2O_3 \cdot 2TiO_2$ is from about 5 to about 10 molar percent, and the proportion of $SrTiO_3$ is from about 3 to about 18 molar percent.
3. A ceramic dielectric material in accordance with claim 1 wherein the proportion of $BaTiO_3$ is about 77 molar percent, the proportion of $La_2O_3 \cdot 2TiO_2$ is about 5 molar percent and the proportion of $SrTiO_3$ is about 18 molar percent.
4. A ceramic dielectric material in accordance with claim 1 wherein the proportion of $BaTiO_3$ is about 87 molar percent, the proportion of $La_2O_3 \cdot 2TiO_2$ is about 10 molar percent and the proportion of $SrTiO_3$ is about 3 molar percent.

References Cited

UNITED STATES PATENTS

| 2,985,700 | 5/1961 | Johnston | 106—39 |
| 3,268,783 | 8/1966 | Saburi | 317—258 |

FOREIGN PATENTS

| 574,577 | 1/1946 | Great Britain. |

OTHER REFERENCES

MacChesney et al.: "Stabilized Barium Titanate Ceramics for Capacitor Dielectrics," J. Am. Ceramic Soc., volume 46 (pp. 197–202), May 21, 1963.

Kainz: "Dielectric Properties of the Systems Barium-Strontium-Lanthanum Titanate," Ceramic Abstracts, October 1958 (p. 277, Item D).

Kainz II: Ber. deut. Keram. Ges., 35[3], pp. 69–77 (1958).

Marzullo et al.: Dielectric Properties of Titania or Tin Oxide Containing Varying Proportions of Rare Earth Oxides, J., Am. Cer. Soc., vol. 41, January 1958, pp. 40–41.

HELEN M. McCARTHY, *Primary Examiner.*

U.S. Cl. X.R.

317—258